United States Patent [19]

Inoue et al.

[11] Patent Number: 4,975,400

[45] Date of Patent: Dec. 4, 1990

[54] CATALYST FOR HYDROTREATING SOLVENT FOR COAL LIQUEFACTION

[75] Inventors: Yoshimasa Inoue, Matsudo; Yukuaki Mitarai, Kamagaya; Toshio Yamaguchi, Tokyo, all of Japan

[73] Assignee: Sumitomo Metal Mining Company Limited, Tokyo, Japan

[21] Appl. No.: 481,764

[22] Filed: Feb. 16, 1990

Related U.S. Application Data

[63] Continuation of Ser. No. 262,725, Oct. 26, 1988, abandoned.

[30] Foreign Application Priority Data

Oct. 27, 1987 [JP] Japan ................................ 62-269271

[51] Int. Cl.$^5$ ............................................. B01J 29/30
[52] U.S. Cl. ....................................................... 502/66
[58] Field of Search ........................................... 502/66

[56] References Cited

U.S. PATENT DOCUMENTS

| | | | |
|---|---|---|---|
| 4,568,655 | 2/1986 | Oleck et al. | 502/66 |
| 4,738,941 | 4/1988 | Dufresne et al. | 502/66 |
| 4,789,654 | 12/1988 | Hirano et al. | 502/66 |

FOREIGN PATENT DOCUMENTS 62-162789  7/1987  Japan .

OTHER PUBLICATIONS

New Developments in Zeolite Science and Technology, 7th International Zeolite Conference, Tokyo, Aug. 17–22, 1988, *Pentasil-Type Zeolites*.

*Primary Examiner*—Carl F. Dees
*Attorney, Agent, or Firm*—Watson, Cole, Grindle & Watson

[57] ABSTRACT

A new catalyst, which is Ni-Mo metal loaded on zeolite-alumina carrier, provides efficient hydrotreatment of solvent for coal liquefaction and cracking of high boiling fractions, especially high boiling n-paraffins, whereby undesired accumulation of n-paraffins can be prevented and liquefaction operations can be stably performed over long periods of time.

10 Claims, No Drawings

CATALYST FOR HYDROTREATING SOLVENT FOR COAL LIQUEFACTION

This application is a continuation, of application Ser. No. 265,725, filed Oct. 6, 1988 and now abandoned.

BACKGROUND OF THE INVENTION

FIELD OF THE INVENTION

The present invention relates to a novel catalyst for hydrotreating solvent for coal liquefaction.

DISCUSSION OF THE PRIOR ART AND DEVELOPMENT OF THE INVENTION

Coal liquefaction fundamentally comprises reacting hydrogen with coal at high temperatures under high pressure to convert a highly condensed hydrocarbon compound having a small atomic ratio of hydrogen/carbon into light, middle and heavy oil components which are low molecular hydrocarbon compounds having a large atomic ratio of hydrogen/carbon. Various methods for coal liquefaction have been proposed. A representative is a method which comprises mixing finely divided coal with a solvent to form a slurry, adding as a catalyst powdery iron oxide or iron sulfide to the slurry and causing liquefaction at a temperature of 430 to 460° C. under a pressure of 150 to 250 kg/cm2 while supplying hydrogen. Hydrocarbon compounds constituting coal are hydrocracked and cracked into liquid hydrocarbons, by hydrogen from hydrogen-donating compounds in the solvent and hydrogen gas in the gaseous phase. This liquid product is recovered as coal liquefied oil but a part with the oil, especially a part of middle and heavy oil components (fractions at 220 to 538° C.) is recycled as a solvent for coal liquefaction for the aforesaid coal liquefaction step; in this case, the solvent is subjected to hydrotreatment in order to impart a hydrogen donating property to the solvent for coal liquefaction. This hydrotreatment of solvent for coal liquefaction is effected by reacting the aforesaid middle and heavy oil components and hydrogen at high temperatures under high pressure, while supplying these components into a reactor packed with the catalyst, together with hydrogen. As the catalyst for hydrotreating, those obtained by carrying a metal belonging to Group VI such as molybdenum, tungsten or the like and a metal of Group VIII such as cobalt, nickel or the like, of the Periodic Table, on a carrier such as alumina, alumina-silica, etc. were promising so far. By this treatment, polycyclic aromatic compounds in the middle and heavy oil components are converted into partially hydrotreated aromatic compounds having hydrogen donating property such as tetralines, 9,10-dihydroanthracenes, etc.

However, these conventional catalysts are excellent in ability of hydrogenating solvents but involve a defect that cracking ability of n-paraffins is poor. The n-paraffins are produced by coal liquefaction and a part of them is discharged out of the system as liquid oil, but in the case of hydrocarbon rich in n-paraffins produced, n-paraffins are gradually accumulated in the recycle solvent for coal liquefaction. The paraffins lack hydrogen-donating property as a solvent for coal liquefaction and solubility of the reaction product so that accumulation of paraffin makes stable operation of coal liquefaction in a high yield over long periods of time impossible.

In order to improve such defects of conventional catalysts, the present inventors proposed hydrotreatment of solvents with catalysts obtained by carrying a metal belonging to Group VI such as molybdenum, tungsten or the like and a metal of Group VIII such as cobalt, nickel or the like, of the Periodic Table, on a carrier such as alumina, alumina-silica, etc. containing mordenite type zeolite ion-exchanged with calcium ions (Published Unexamined Japanese Patent Application Laid-Open No. 62-164789). With the catalysts, a cracking rate of high boiling paraffin reaches approximately 50%. However, some hydrocarbons are yet insufficient even with this cracking capability. It has been demanded to develop a catalyst having more excellent n-paraffin cracking capability.

SUMMARY OF THE INVENTION

An object of the present invention is to provide a catalyst for hydrotreating solvent for coal liquefaction which can efficiently degrade paraffin even in hydrocarbons producing large quantities of n-paraffins to prevent high boiling paraffin from accumulation in the solvent and can effect coal liquefaction stably over long periods of time.

DETAILED DESCRIPTION OF THE INVENTION

To achieve the object, the catalyst of the present invention is characterized in that, when calculated as the oxide, 5 to 20 wt% of at lest one member selected from metals of Group VI and 1 to 10 wt% of at least one member selected from metals of Group VIII, in the Periodic Table, are loaded on a carrier composed of 80 to 20 wt% of $\gamma$-alumina and 20 to 80 wt% of pentasil type zeolite having a molar ratio in $SiO_2/Al_2O_3$ of 25 to 100, an average pore diameter is at least 120 Å in pore distribution measured by mercury compression method and a volume of pores having a diameter of not less than 100 Å is at least 60% of a volume of pores having a diameter of not less than 40 Å.

The carrier used in the present invention is composed of $\gamma$-alumina and pentasil type zeolite and obtained by kneading alumina hydrate called pseudoboehmite and pentasil type zeolite, molding, then drying and sintering. The alumina hydrate used for the carrier is obtained by alternatively adding a mixture of nitric acid and sulfuric acid and a solution of sodium aluminate to a slurry containing as seed crystals, for example, aluminum hydroxide thereby to change a pH value of the slurry to an acidic range of 2.5 or less and then to an alkaline range of 9.5 or higher and repeating this operation to grow crystals of aluminum hydroxide. Using this alumina hydrate, the carrier having a large pore diameter suited for the catalyst of the present invention can be obtained.

Pentasil type zeolite which is another element of the carrier used in the present invention is crystalline aluminosilicate generally having a composition represented by $MSi_xAl_yO_z.aH_2O$ (wherein M is a cation and, x, y, z and z each is a real number) and can be synthesized by reacting a source for $SiO_2$ such as sodium silicate with a source for $Al_2O_3$ such as aluminum nitrate or aluminum chloride in an autoclave.

A molar ratio in $SiO_2/Al_2O_3$ of this pentasil type zeolite is an important factor which governs a n-paraffin cracking function; when the molar ratio exceeds 100, an amount of solid acid greatly decreases and the n-paraffin cracking activity also decreases. Further when the $SiO_2/Al_2O_3$ molar ratio is less than 25, an amount of solid acid increases so that n-paraffin cracking activity is high but side reactions accompany, whereby inactivation due to precipitation of coke becomes serious and life of catalyst is shortened. Accordingly, it is required that the $SiO_2/Al_2O_3$ molar ratio be maintained in a range of 25 to 100. preferably in a range of 35 to 80. This is because the amount of solid acid in the zeolite increases due to ion exchange of alkali metal ions with hydrogen and the n-paraffin cracking function increases. This ion exchange can be easily performed by contacting the zeolite with an aqueous solution of hydrochloric acid, ammonium chloride, etc. By repeating this ion exchange, washing and drying, a hydrogen ion exchange rate can be enhanced. A hydrogen ion exchange rate of the zeolite is preferably 50% or more.

It is necessary that a ratio of $\gamma$-alumina to the zeolite in the carrier should be that 20 to 80 wt% of pentasil type zeolite is used based on 80 to 20 wt% of $\gamma$-alumina. This is because, when the zeolite in the carrier is less than 20 wt%, the n-paraffin cracking ability becomes poor and when it exceeds 80%, strength of the carrier is markedly reduced. A preferred ratio of pentasil type zeolite to be formulated is 25 to 60 wt%.

It is desired that a particle diameter of pentasil type zeolite used in the present invention be 5 $\mu$ or less. This is because when the particle diameter is greater than 5 $\mu$, the kneading product with alumina hydrate becomes non-uniform and the zeolite is non-uniformly dispersed in the carrier to reduce strength of the carrier.

Catalyst components which are active for hydrotreating solvent are loaded on the carrier described above. The catalyst components are, when calculated as the oxide, 5 to 20 wt% of at lest one member selected from metals of Group VI and 1 to 10 wt% of at least one member selected from metals of Group VIII, in the Periodic Table. A preferred metal of Group VI is molybdenum. Preferred metals of Group VIII are nickel and/or cobalt. Excessively large amounts of these metals to be loaded result not only in poor economy but also in conversely reducing the catalyst activity. On the other hand, when an amount to be loaded is lower than the lower limit, a function of hydrotreating solvent is reduced and the n-paraffin cracking ability is also reduced.

In the catalyst of the present invention, its pore distribution is extremely important; it is necessary that an average pore diameter is at least 120 Å in pore distribution measured by mercury compression method and a volume of pores having a diameter of not less than 100 Å is at least 60% of a volume of pores having a diameter of not less than 40 Å. When the pore diameter is smaller, resistance to diffusion of n-paraffins in the catalyst particles is large and cracking activity becomes small. Accordingly, it is desired that the pore diameter be as large as possible for cracking of n-paraffins. However, excessively large pore diameter results in reduction in a specific surface area of the catalyst so that the activity decreases and strength also decreases. Therefor, an average pore diameter of approximately 250 Å would be the upper limit. The pore diameter can be controlled by increasing or decreasing the repeating number of alternate addition of sodium aluminate and the mixed acid in the aforesaid preparation of alumina hydrate.

The catalyst of the present invention can be used under reaction conditions similar to those of the prior art catalyst. That is, the catalyst of the present invention is packed in a reaction tower, the middle and heavy oil components obtained in the coal liquefaction step are fed in the tower together with hydrogen followed by reacting at a temperature of 350 to 450° C. under a pressure of 50 to 150 kg/cm$^2$.

A liquid space velocity (=oil amount fed per unit time (liter/hr)/amount of catalyst packed (liter)) is appropriately in a range of 0.2 to 2 hr$^{-1}$ and an amount of hydrogen to be fed is in a range of about 500 to 1000 Nm$^3$/kiloliter as a ratio to solvent.

The thus treated solvent may be supplied to the coal liquefaction step as it is; alternatively, it may be supplied to the coal liquefaction step after the light fraction is recovered by distillation.

EXAMPLES

The present invention will be described in more detail by referring to the examples below but is not deemed to be limited thereto.

EXAMPLE 1

(1) Preparation of catalyst

A slurry of aluminum hydroxide was obtained by reacting a sodium aluminate solution having a $Na_2O/Al_2O_3$ molar ratio of 1.56 and containing 18.4 wt% as $Al_2O_3$ with a mixture of nitric acid and sulfuric acid. This slurry was made seed crystals. By alternatively adding the sodium aluminate solution and the mixture of nitric acid and sulfuric acid described above to the slurry 6 times in total, aluminum hydroxide crystals were grown, filtered and washed to give alumina hydrate ($Al_2O_3$ content, 16 wt%).

On the other hand, a mixture of a solution of No. 3 water glass (29.0% of $SiO_2$ and 9.5% of $Na_2O$) and a solution of aluminum chloride was charged in an autoclave. While stirring the mixture, the temperature was elevated to 170° C. and then settled for 24 hours while keeping the temperature. The product was filtered, washed with water and then subjected to hydrogen ion exchange with hydrochloric acid. Drying and sintering gave hydrogen ion exchange type pentasil type zeolite having a mean particle diameter of 2.3 $\mu$, 5.0 wt% of $SiO_2$ 3.6 wt% of $Al_2O_3$, a $SiO_2/Al_2O_3$ molar ratio of 45 and 0.11 wt% of $Na_2O$.

To 90 parts by weight of the aforesaid alumina hydrate were added 10 parts by weight of pentasil type zeolite. The mixture was kneading with heating and molded into powders showing a diameter of 1.0 mm through an extrusion molding machine. After drying at 120° C. for 16 hours, sintering was performed at 500° C. in the air to give a catalyst carrier.

After the carrier was immersed in a solution of ammonium molybdate and nickel nitrate, the carrier was dried at 120° C. for 10 hours and sintered at 500° C. for 2 hours in the air to give Catalyst A. Amounts of molybdenum and nickel loaded on this Catalyst A were 17 wt% and 4 wt%, respectively, when calculated as the oxide.

(2) Efficiency of catalyst

With respect to the catalyst prepared as described above, its efficiency was examined as follows. First, 50 ml of the catalyst was packed in a cylindrical reactor to make it a solid bed reactor. Light oil added with 3 wt% of n-butylmercaptane was passed through the reactor to perform presulfiding. Conditions for the sulfurization were at a temperature of 300° C., under hydrogen pressure of 100 kg/cm$^2$, a liquid space velocity of 1.0 hr$^{-1}$, a hydrogen/sulfurized oil ratio of 1000 Nl/l and 10 hours. Then, coal liquefaction oil showing properties of Table 1 obtained by liquefaction of Australian Wandoan coal was passed through the reactor together with hydrogen to effect hydrotreatment.

TABLE 1

| | |
|---|---|
| Aromaticity fa* | 0.659 |
| 350° C.+fraction** | 27.8 wt % |
| $C_{22}+$ n-paraffin*** | 5.28 wt % |

(Notes)
*Aromaticity fa = number of carbon atoms in oil/number of whole carbon atoms in oil
**fraction of heavy oil showing a boiling point of 350° C. or higher
***n-paraffins having 22 or more carbon atoms In this hydrotreatment, the reaction temperatures were set 380° C., 410° C. and 440° C.; the other conditions were hydrogen pressure under 100 kg/cm², a liquid space velocity of 1.0 hr$^{-1}$, and a hydrogen/coal liquefaction oil ratio of 1000 N1/1. Treatment was carried out for 80 hours at each temperature. Hydrotreated oil was withdrawn for sampling at every an hour after the treatment for 12 hours. With respect to these average samples, aromaticity fa, a cracking rate of heavy fractions (boiling point of 350° C. or higher) and a cracking rate of high boiling paraffins (having 22 or more carbon atoms) were examined. The results are shown in Table 2.

TABLE 2

| Catalyst | Temperature (°C.) | Aromaticity fa | Cracking Rate of Heavy Fractions (%) | Cracking Rate of High Boiling Paraffins* (%) |
|---|---|---|---|---|
| A | 380 | 0.41 | 31 | 36 |
| | 410 | 0.42 | 47 | 74 |
| | 440 | 0.49 | 57 | 98 |

From Table 2, it is understood that Catalyst A has an extremely excellent high boiling paraffin cracking ability.

EXAMPLE 2

Alumina hydrates were obtained by changing the frequency of alternate addition of the sodium aluminate solution and the mixture of nitric acid and sulfuric acid. Further pentasil type zeolite having different hydrogen ion exchange degrees, various $SiO_2/Al_2O_3$ molar ratios and various $Na_2O$ contents were obtained. By various combinations of them, Catalysts B, C, D, E, F, G and H were prepared in a manner similar to Example 1. Composition and properties of each catalyst are shown in Table 4.

Also with respect to these catalysts, efficiencies were examined in a manner similar to Example 1. Properties of liquefied oil used are shown in Table 3. The results are summarized and shown in Table 4.

In Table 4, catalyst efficiencies are expressed by relative volume activity indices when each activity of Catalyst A in Example 1 was made 100.

TABLE 3

| | |
|---|---|
| Carbon | 89.15 wt % |
| Hydrogen | 10.16 wt % |
| Nitrogen | 0.22 wt % |
| Sulfur | 0.05 wt % |
| Oxygen | 0.4 wt % |
| Toluene insoluble matters | 0.02 wt % |
| 350° C.+fraction | 35.2 wt % |
| Whole n-paraffins | 14.57 wt % |
| $C_{22}+$ n-paraffins | 4.98 wt % |
| Aromaticity fa* | 0.48 wt % |

TABLE 4

| Catalyst No. | Metal/ Amount Loaded (wt %) | Zeolite Content Loaded on Carrier (wt %) | Specific Surface Area (m²/g) | Pore Volume (ml/g) | Mean Pore Diameter (Å) | Hydrogenation fa | 350° C.+ Cracking | $C_{22}+$ n-P Cracking | |
|---|---|---|---|---|---|---|---|---|---|
| A | NiO—MoO₃/ 4-17 | 40 SiO₂/Al₂O₃ 45 Na₂O 0.11 | 217 | 0.39 | 192 | 100 | 100 | 100 | Invention |
| B | NiO—MoO₃/ 4-17 | 0 | 172 | 0.62 | 172 | 107 | 111 | 0 | Comparison |
| C | NiO—MoO₃/ 4-17 | 10 SiO₂/Al₂O₃ 64 Na₂O 0.11 | 179 | 0.57 | 232 | 128 | 64 | 55 | " |
| D | NiO—MoO₃/ 4-17 | 20 SiO₂/Al₂O₃ 64 Na₂O 0.11 | 165 | 0.51 | 250 | 123 | 83 | 82 | Invention |
| E | NiO—MoO₃/ 4-17 | 60 SiO₂/Al₂O₃ 51 Na₂O 0.02 | 232 | 0.33 | 138 | 85 | 99 | 100 | " |
| F | NiO—MoO₃/ 3-11 | 40 SiO₂/Al₂O₃ 31 Na₂O 0.06 | 243 | 0.32 | 124 | 110 | 113 | 134 | " |
| G | NiO—MoO₃/ 1-7 | 40 SiO₂/Al₂O₃ 64 Na₂O 0.11 | 235 | 0.46 | 192 | 87 | 71 | 4 | Comparison |
| H | NiO—MoO₃/ 4-17 | 40 SiO₂/Al₂O₃ 51 Na₂O 0.02 | 286 | 0.33 | 86 | 83 | 115 | 67 | " |

*Cracking rate of high boiling paraffin (%)

$$= \frac{P_o - P}{P_o} \times 100$$

$P_o$: ratio of paraffins having 22 or more carbon atoms in the raw coal liquefaction oil (wt %)
P: ratio of paraffins having 22 or more carbon atoms in the hydrotreated oil (wt %)

In Table 4, it is shown that Catalysts B and C and Catalyst G all provide poor n-paraffin cracking ability and poor cracking ability of high boiling fractions, because zeolite content is too low in Catalysts B and C and Catalyst G is short for active metal; further in Catalyst H, its mean pore diameter is too small so that n-paraffin cracking ability is somewhat insufficient.

The catalyst of the present invention can effectively perform hydrotreatment of solvent, cracking of high boiling fractions and paraffin cracking and is particularly excellent in cracking ability of high boiling paraffins. For this reason, accumulation of paraffins can be prevented in coal liquefaction of even hydrocarbons producing large quantities of paraffins so that operation for liquefaction can be stably performed over long periods of time.

While the invention has been described in detail and with reference to specific embodiments thereof, it is apparent to one skilled in the art that various changes and modifications can be made therein without departing from the spirit and the scope of the present invention.

What is claimed is:

1. A catalyst for hydrotreating solvent for coal liquefaction characterized in that, when calculated as the oxide, 5 to 20 wt% of at least one member selected from metals of Group VI and 1 to 10 wt% of at least one member selected from metals of Group VIII, in the Periodic Table, are loaded on a carrier composed of 80 to 20 wt% of γ-alumina and 20 to 80 wt% of pentasil zeolite having a molar ratio in SiO₂/Al₂O₃ of 25 to 100, an average pore diameter above 120 Å to maximize cracking n-paraffins and below 250Å to avoid a reduction of the catalyst specific surface are and a reduction of catalyst activity and strength in pore distribution measured by mercury compression method and a volume of pores having a diameter of not less than 100Å is at least 60% of a volume of pores having a diameter of not less than 40Å.

2. A catalyst for hydrotreating solvent according to claim 1, wherein said zeolite is crystalline aluminosilicate having a composition represented by formula below:

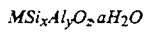

$MSi_xAl_yO_z aH_2O$ wherein M is a cation and, x, y, z and z each is a real number.

3. A catalyst for hydrotreating solvent according to claim 1, wherein said SiO₂/A₂O₃ molar ratio in zeolite is in a range of 35 to 80.

4. A catalyst for hydrotreating solvent according to claim 1, wherein said zeolite is one that alkali metal ions are ion exchanged with hydrogen ions.

5. A catalyst for hydrotreating solvent according to claim 4, wherein a hydrogen ion exchange rate in said zeolite is not less than 50%.

6. A catalyst for hydrotreating solvent according to claim 1, wherein a rate of γ-alumina and zeolite formulated in said carrier is 75 to 40 wt% of γ-alumina and 25 to 60 wt% of zeolite.

7. A catalyst for hydrotreating solvent according to claim 1, wherein said zeolite has a diameter of not greater than 5 γ.

8. A catalyst for hydrotreating solvent according to claim 1, wherein said metal of Group VI is molybdenum and said metal of Group VIII is at least one selected from the group consisting of nickel and cobalt.

9. A catalyst for hydrotreating solvent according to claim 1, wherein the particle diameter of said pentasil zeolite is 5u or less to result in a uniform kneading product with the γ-alumina.

10. A catalyst for hydrotreating solvent for coal liquefaction characterized in that, when calculated as the oxide, 5 to 20 wt% of at least one member selected from metals of Group VI and 1 to 10 wt% of at least one member selected from metals of Group VIII, in the Periodic Table, are loaded on a carrier composed of 80 to 20 wt% of γ-alumina and 20 to 80 wt% of pentasil zeolite having a molar ratio in SiO₂/Al₂O₃ of 25 to 100, an average pore diameter above 120Å to maximize cracking n-paraffins and below 250Å to avoid a reduction of catalyst activity and strength in pore distribution measured by mercury compression method and a volume of pores having a diameter of not less than 100Å is at least 60% of a volume of pores having a diameter of not less than 40Å, wherein the particle diameter of said pentasil zeolite is 5u or less to result in a uniform kneading product with the γ-alumina.

* * * * *